3,152,156
TRI-n-BUTYL-t-BUTYLPEROXY STANNANE
Orville L. Mageli, Grand Island, and James B. Harrison, Eggertsville, N.Y., assignors to Wallace & Tiernan Incorporated, Newark, N.J.
No Drawing. Filed July 1, 1959, Ser. No. 824,196
1 Claim. (Cl. 260—429.7)

The present invention relates to organotin peroxides and more particularly to a class of such compounds as may be designated organo peroxy stannanes.

A simple structural formula of the peroxy stannanes may be considered to be:

$$(R)_xSn[OOC(R')_3]_y$$

where $x+y$ is equal to 4, and $x$ or $y$ may be the integers 1 to 3 inclusive, and wherein R may be phenyl or an alkyl group containing 1 to 4 carbon atoms, and wherein R' may be an alkyl, alicyclic, hydrogen or phenyl group. The group R' is further defined as containing 1 to 8 carbon atoms where R' is an alkyl radical, or 3 to 8 carbon atoms, where R' is an alicyclic radical. R and R' may be multiple radicals, may be the same, or may be different.

Thus, some of the compounds contemplated within the invention are triethyl t-butylperoxy stannane; di-n-butyl di(t-butylperoxy) stannane, tri-n-butyl t-butylperoxy stannane; dimethyl di(t-butyl peroxy) stannane; tri-n-butyl alpha-cumylperoxy stannane, tri-phenyl t-butylperoxy stannane, tri-phenyl ethylperoxy stannane, diphenyl di(t-butylperoxy) stannane, phenyl tri(t-butylperoxy) stannane, triethyl alpha-cumylperoxy stannane, 2,5-dimethyl-2,5-di(tri-n-butyl stannane peroxy) hexane and 3,6-dimethyloctane-3,6-diperoxy diphenyl stannane.

The new peroxy tin compounds of the present invention can be readily prepared by reaction of an organotin compound with a hydroperoxide. Thus, starting with tetra alkyl tin or tetra aryl tin compound, this may be converted according to the general method of Kozeschkov et al., Ber. 67, 1348 (1934), by reaction with stannic halide to a desired organotin chloride since there is, in the reaction, a regular partition of the available organo groups over all the tin atoms. Thus the reaction of tetraphenyl tin with stannic chloride is represented as follows:

$$(C_6H_5)_4Sn+SnCl_4 \rightarrow 2(C_6H_5)_2SnCl_2$$

By selection of the proper amount of tin chloride for reaction with tetra organotin, there results an organotin-mono-chloride, -dichloride, or -trichloride.

In accordance with the procedures of the present invention, such organotin halides are reacted in substantially stoichiometric amounts with an organic hydroperoxide in the presence of a restricted amount of relatively strong inorganic alkali, as for instance, caustic potash. The reaction proceeds either in aqueous solution or in the presence of an inert organic solvent, as for instance petroleum ether.

The reaction appears to occur through an ionic mechanism as follows, illustrated by the use of the potassium salt of t-butyl hydroperoxide:

$$C_2H_5SnCl_3+3KOOC(CH_3)_3=3KCl+$$
$$C_2H_5Sn[OOC(CH_3)_3]_3$$
Ethyl tri(t-butylperoxy) stannane or as another specific example:
$$(C_6H_5)_3SnCl+KOOC(CH_3)_3=KCl+$$
$$(C_6H_5)_3SnOOC(CH_3)_3$$
Triphenyl t-butylperoxy stannane
$$(C_6H_5)_2SnCl_2+2KOOC(CH_3)_3=2KCl+$$
$$(C_6H_5)_2Sn[OOC(CH_3)_3]_2$$
Diphenyl di(t-butylperoxy) stannane The class of organoperoxy stannanes discussed herein are relatively stable, probably by reason of the metal-carbon bonds, although they are hydrolyzed either with acids or wth alkalies. Acid hydrolysis, as for instance acetic acid, produces the organotin acetate; hydrolysis with strong bases, particularly, forms the organotin oxides or hydroxides. The class of peroxy stannanes discussed herein possess desirable characteristics as fungicides, miticides, and insecticides, and as an initiator of polymerization for certain polymerizable monomers, as for instance the class of polymers called polyester resins.

Since the reaction of the organotin chloride with the organohydroperoxide in aqueous solution, in a strongly alkaline environment, is probably an ionic reaction and probably reversible, it will be found more desirable to prepare those end products which appear to be readily hydrolyzed in the presence of aqueous alkali, in an organic environment in order to reduce the reversibility of the reaction.

This characteristic of reversibility is particularly true in those compounds where a phenyl group is directly connected to tin and where it is preferred to carry out the reaction in an aqueous alkaline environment, better results and yields are obtained by employing alkyltin halides with organo hydroperoxide metal salt.

In aqueous solution, the alkali may be any strong hydroxide, as for instance the hydroxides of either the alkali metals or the alkaline earth metals, and preferably the alkali metal hydroxides.

The alkylperoxy stannanes are rather easily hydrolyzed. In the presence of glacial acetic acid there appears to be almost instantaneous formation of alkylation acetate and liberation of the hydroperoxide.

The preparation and isolation of the peroxy stannane is thus preferably carried out in an alkaline environment where the alkyltin halide is dissolved in an inert organic solvent, such as petroleum ether, to which the potassium salt, for instance, of the organic hydroperoxide is brought into the reaction environment as a concentrated aqueous solution. The alkali should be an inorganic alkal as, apparently, complexes form with organic bases, such as pyridine.

The experimental evidence points to the fact that best yields and purity of end product are obtained when substantially the stoichiometric amounts of reactants are employed and when preferably the alkali metal or alkaline earth metal salt is reacted with a specified organotin halide since the latter may react preferentially with excess alkali to form organotin oxide.

The following examples are illustrative of the procedures employed in making the organo peroxy tin compounds of the present invention.

EXAMPLE 1

*Tri-n-Butyl t-Butylperoxy Stannane*

Into a vessel equipped with thermometer and stirrer, there is placed a solution of 2.2 parts by weight of potassium hydroxide (0.04 mole) in 8.8 parts by weight of water. The solution is cooled below 10° C. with ice water and 1.8 parts by weight of t-butyl hydroperoxide (0.04 mole) is added dropwise, not allowing the temperature to rise above 10° C. The stirring is continued for 10 more minutes to be sure that the formation of the potassium salt of the t-butyl hydroperoxide is complete. Now, 13.0 parts by weight tri-n-butyl tin chloride (0.04 mole) dissolved in 50 ml. petroleum ether, is added slowly. Special cooling is not required. The reaction is continued for one hour at room temperature. The aqueous layer is separated from the reaction mixture and the petroleum ether solution is dried with anhydrous magnesium sulfate. Unreacted tri-n-butyltin chloride can be removed as the insoluble ammonia complex by saturating the petroleum ether solution with dry ammonia gas. Part of the product will be hydrolyzed if water washings are applied. This lowers the active oxygen content of the final product. Yields ranging from 70 to 85% were obtained.

The final product was a liquid boiling at 87° C. at 0.04 mm. Hg. An ultimate analysis gave Sn—30.45%; H—9.53%; C—49.81%. Calculated for $(CH_3CH_2CH_2CH_2)_3Sn$—O—O—$C(CH_3)_3$; Sn—31.30%; H—9.57%; C—50.70%. According to active oxygen assay, the product possessed a purity of 95%.

EXAMPLE 2

Triethyl t-Butylperoxy Stannane

The triethyl t-butylperoxy stannane was prepared in a manner analogous to the preparation of the compound of Example 1, using 0.02 mole of potassium hydroxide, 0.02 mole of t-butyl hydroperoxide, and 0.02 mole (4.8 parts by weight) of triethyltin chloride. The final liquid product is relatively water soluble, so water washings should not be used.

EXAMPLE 3

Tri-n-Butyl α-Cumylperoxy Stannane

The tri-n-butyl α-cumylperoxy stannane was prepared in a maner employed in Examples 1 and 2, using 0.02 mole α-cumyl hydroperoxide, 0.02 mole KOH and 0.02 mole of tri-n-butyl tin chloride (6.5 parts by weight).

The raw product was obtained in yields of better than 80% and a purity based on active oxygen content (iodometric assay) of better than 95%.

The physical constants of a few of the compounds of the present invention are listed below in Table 1:

TABLE 1

Compounds

A—Triethyl t-butylperoxy stannane
$(C_2H_5)_3SnOOC(CH_3)_3$

B—Tri-n-butyl t-butylperoxy stannane
$(C_4H_9)_3SnOOC(CH_3)_3$

C—Tri-n-butyl α-cumylperoxy stannane
$(C_4H_9)_3SnOOC(CH_3)_2C_6H_5$

D—Dimethyl di(t-butylperoxy) stannane
$(CH_3)_2Sn(OOC(CH_3)_3)_2$

E—Di-n-butyl di(t-butylperoxy) stannane
$(C_4H_9)_2Sn(OOC(CH_3)_3)_2$

CHARACTERISTICS OF ORGANOTIN PEROXIDES

| Compound | Liquid or Solid | B.P. (M.P.) | $n_D^{25}$ | $d_4^t$ | MRd Cal'd | MRd Found | Purity Based on Iodometric Act. (0) Assay, percent |
|---|---|---|---|---|---|---|---|
| A | L | | 1.4787 | | | | 60 |
| B | L | 87° C. (0.04 mm.) | 1.4617 | 1.097 (27°C.) | 95.77 | 95.35 | 97 |
| C | L | | 1.5033 | 1.129 (29.5° C.) | 114.99 | 115.15 | 95 |
| D | S | 160-161° C. (d) | | | | | 69 |
| E | Viscous L | | | | | | 53.7 |

What is claimed is:
Tri-n-butyl-t-butylperoxy stannane.

References Cited in the file of this patent

UNITED STATES PATENTS

| | | |
|---|---|---|
| 2,910,495 | George | Oct. 27, 1959 |
| 2,937,994 | Holdstock | May 24, 1960 |
| 2,937,995 | Holdstock et al. | May 24, 1960 |

OTHER REFERENCES

Buncel et al.: "Chemistry and Industry," October 6, 1956, pp. 1052–1053.

Rochow et al.: "Chemistry of the Organometallic Compound," John Wiley and Sons, Inc., 1957, pp. 142–143 relied on.

Rieche et al.: "Angew. Chem." 70, No. 16, (August 1958), p. 507.

UNITED STATES PATENT OFFICE
CERTIFICATE OF CORRECTION

Patent No. 3,152,156                                October 6, 1964

Orville L. Mageli et al.

It is hereby certified that error appears in the above numbered patent requiring correction and that the said Letters Patent should read as corrected below.

Column 2, line 32, for "alkylation" read -- alkyltin --; line 40, for "alkal" read -- alkali --; column 4, in the table, under the column heading "$d_4^t$", line 3 thereof, for "$^1(27°\ C.)$" read -- $(27°\ C.)$ --.

Signed and sealed this 18th day of May 1965.

(SEAL)
Attest:

ERNEST W. SWIDER                                    EDWARD J. BRENNER
Attesting Officer                                        Commissioner of Patents